(12) United States Patent
Sada

(10) Patent No.: US 8,939,460 B2
(45) Date of Patent: Jan. 27, 2015

(54) FOLDABLE BICYCLE WITH SPOKELESS WHEELS

(76) Inventor: Gianluca Sada, Battipaglia (IT)

(*) Notice: Subject to any disclaimer, the term of this patent is extended or adjusted under 35 U.S.C. 154(b) by 0 days.

(21) Appl. No.: 13/261,413

(22) PCT Filed: Feb. 23, 2011

(86) PCT No.: PCT/EP2011/000878
§ 371 (c)(1),
(2), (4) Date: Aug. 30, 2012

(87) PCT Pub. No.: WO2011/107232
PCT Pub. Date: Sep. 9, 2011

(65) Prior Publication Data
US 2012/0319377 A1    Dec. 20, 2012

(30) Foreign Application Priority Data
Mar. 5, 2010  (IT) .............................. TO2010A0166

(51) Int. Cl.
*B62K 15/00*    (2006.01)

(52) U.S. Cl.
CPC .................................... *B62K 15/006* (2013.01)
USPC ....................................................... 280/287

(58) Field of Classification Search
CPC ..... B62K 15/00; B62K 15/006; B62K 15/008
USPC ............ 180/208; 280/87.05, 278, 287, 491.1, 280/638
See application file for complete search history.

(56) References Cited

U.S. PATENT DOCUMENTS

2010/0148467 A1* 6/2010 Hoerdum et al. ............. 280/278

FOREIGN PATENT DOCUMENTS

| DE | 102007013158 A1 | 9/2008 |
| GB | 2426962 A | 12/2006 |
| WO | WO 02/092417 A1 | 11/2002 |

* cited by examiner

*Primary Examiner* — Joseph M Rocca
*Assistant Examiner* — Felicia L Brittman
(74) *Attorney, Agent, or Firm* — Modiano & Associati; Daniel J. O'Byrne; Albert Josif

(57) ABSTRACT

A foldable bicycle provided with a frame, the frame comprising a first arm having a rear end to which a rear wheel is linked, a fork with handlebar to which a front wheel is linked, a bar connecting a front end of the first arm to the fork and hinged to the first arm and a post supporting a saddle and hinged to the first arm. The first arm, the bar and the post are interconnected by transmission elements for simultaneously rotating about the axes between an operative configuration and a carrying configuration. The transmission elements comprise a first engagement angular sector rotatably coupled with said post via first linkages, and a second engagement angular sector in rotary engagement with the first engagement angular sector and rotatably coupled with the bar via second linkages.

14 Claims, 6 Drawing Sheets

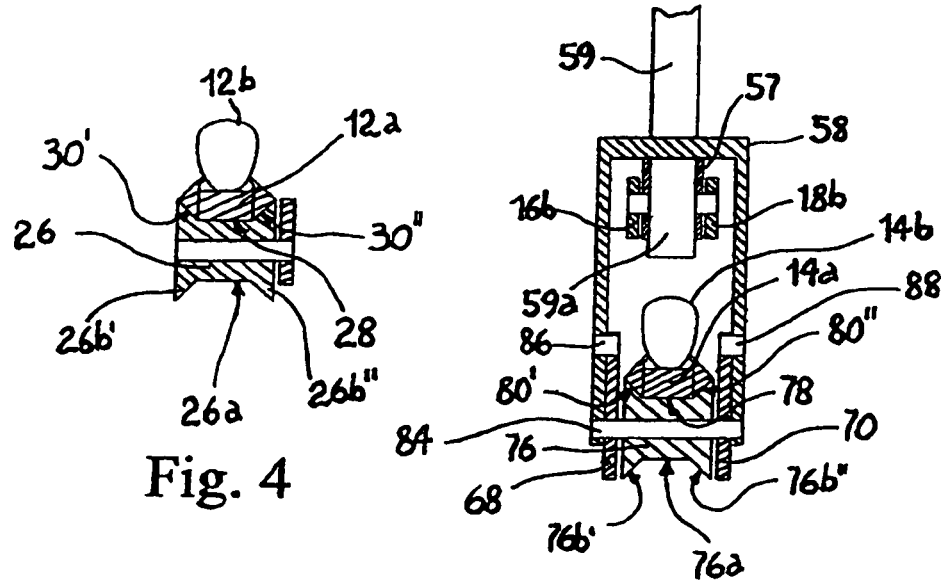
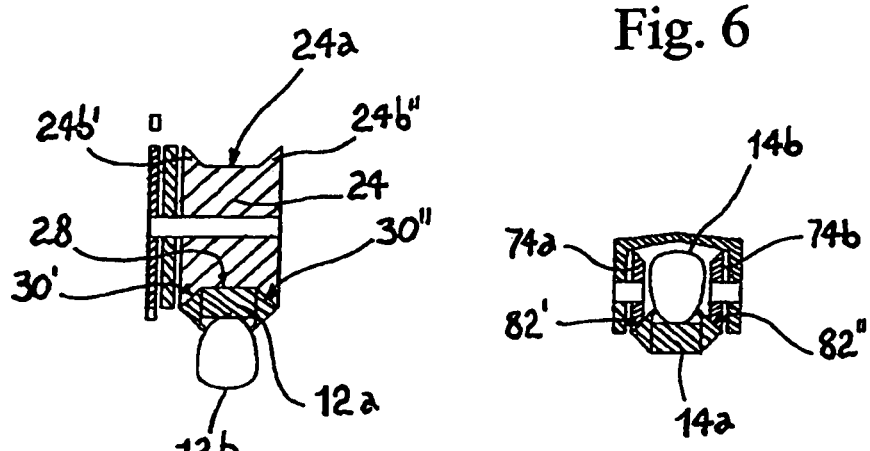
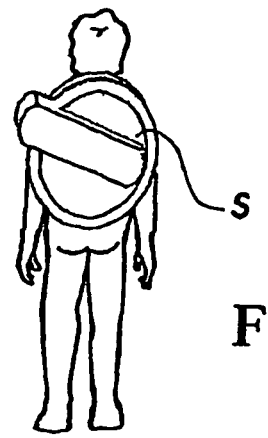
Fig. 4
Fig. 6
Fig. 5
Fig. 7
Fig. 16

FOLDABLE BICYCLE WITH SPOKELESS WHEELS

The present invention relates to a foldable bicycle with spokeless wheels.

BACKGROUND OF THE INVENTION

Foldable bicycles have been known for many years, e.g., the bicycle described in GB 2,287,438, in which the frame has a middle articulation joint which allows it to be folded by 180° about a vertical axis, after releasing a locking mechanism, in order to halve the longitudinal size of the bicycle and allow the latter to be eaily carried on a vehicle.

Other foldable bicycle are known, e.g., from DE 10 2007 013158 A1, wherein the frame consists of various frame parts hinged to one another about transverse axes and are interconnected for simultaneously rotating from an operative configuration to a folded, carrying configuration.

The above-described foldable bicycles have the drawback that the frame and the wheels are relatively small-sized, because they are designed to obtain a very compact folded configuration, to the detriment of the driving comfort and performance, which, in fact, are very limited, especially on uneven roads.

Moreover, even in their folded configuration, the above bicycles are heavy-weighted and sizable, so that they are not suitable to be carried by hand.

In the attempt of improving the driving comfort, WO/2006/131742 describes a foldable bicycle provided with standard-sized wheels. The frame has a front end and a rear end which are foldable about respective vertical axes, to which ends the two wheels are hinged. In particular, both the wheels of the bycicle of the above document are spokeless and are supported by a set of bearings engaged between the wheel and a respective guide attached to the frame. The lack of spokes allows some mechanical parts, such as the pedals, to be stored in the inner area of the wheels when the bicycle is folded, in order to reduce its overall size.

The above-mentioned bicycle, of course, is handier to be driven than the bicycles with small-sized wheels such as the one described in the above-cited document, GB 2,287,438, and the folding system makes it easier to carry the bicycle on a vehicle. However, the bicycle, even when folded, is yet too cumbersome to be carried by hand.

Furthermore, the above folding system having a frame provided with two articulation joints may be difficult to handle for the cyclist, who must handle the various parts of the frame while the latter is laying in precarious balance on the two wheels.

Nevertheless, although the use spokeless wheels is convenient because it reduces the weight of the bicycle, improves the aerodynamic properties, and prevents the risk of undesired locks caused by the intrusion of rigid bodies and/or limbs of the human body between the spokes, however the wheel-supporting system of the above document is liable to jamming in case of dust, sand or stones slipping into the bearings.

Other systems are known for connecting spokeless wheels to the frame of a bicycle, such as those described in U.S. Pat. Nos. 5,419,619 and 5,248,019, which provide for the use of an inner, stationary rim integral with the frame and an outer, rotary rim, with a crown of balls engaged between the rims. In other systems, such as the one described in U.S. Pat. No. 917,967, the wheel is locked by three rollers spaced from one another by two adjustable members.

With the above-cited systems, the advantages resulting from using spokeless wheels are limited, because the structure that connects the wheel to the frame is heavy and obstructs a considerable fraction of the inner area of the wheel.

SUMMARY OF THE INVENTION

Therefore, it is a main object of this invention to provide a foldable bicycle which, in its operative configuration, has a standard size likewise a traditional city bicycle, but can be converted to a folded, carrying configuration which is considerably smaller in size than the known foldable bicycles, in order to allow the bicycle to be easily carried by hand or on a shoulder.

It is another object of the invention to provide a bicycle provided with a handy, practical folding system, which minimizes the number of actions and operations required for converting the bicycle from its operative configuration to its folded configuration, and vice versa.

In is a further object of the invention to provide a bicycle which, even though provided with spokeless wheels, is not subjected to jamming and has a reliable, lightweight system for connecting the wheels to the frame.

The above object and other advantages, which will better appear from the following description, are achieved by the foldable bicycle having the features recited in claim 1, while the dependent claims state other advantageous, though secondary features, of the invention.

BRIEF DESCRIPTION OF THE DRAWINGS

The invention will be now described in more detail with reference to a preferred, non-exclusive embodiment, shown by way of non limiting example in the attached drawings, wherein:

FIG. 4 is a view in axial cross-section to an enlarged scale of a detail of FIG. 1 along plane IV-IV;

FIG. 5 is a view in axial cross-section to an enlarged scale of a detail of FIG. 1 along plane V-V;

FIG. 6 is a view in axial cross-section to an enlarged scale of a detail of FIG. 1 along plane VI-VI;

FIG. 7 is a view in axial cross-section to an enlarged scale of a detail of FIG. 1 along plane VII-VII;

FIG. 16 shows the bicycle folded in its carrying configuration, while carried in a bag by a generic user.

DESCRIPTION OF THE PREFERRED EMBODIMENTS

Figure 1:
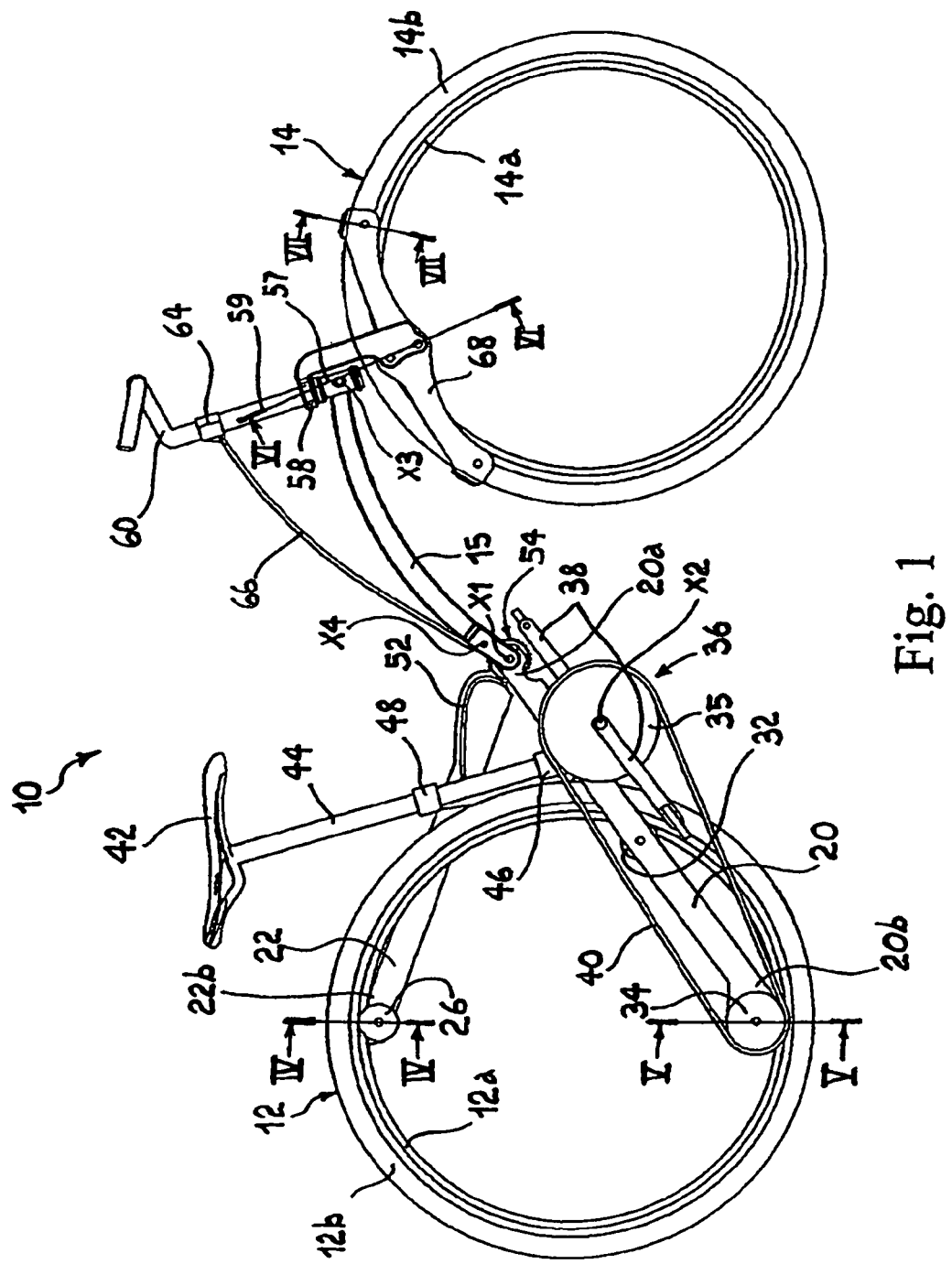
FIG. 1 is a view in side elevation of the bicycle according to the invention.

With reference to the above Figures, a bicycle 10 is provided with a frame supported on a rear wheel 12 and a front wheel 14. Each of the wheels comprises an annular frame, usually called spokeless rim 12a, 14a, which supports a conventional tubular tire 12b, 14b made of a synthetic material. Tubular tire 12b, 14b may be both of the type provided with an inner tube and of the tubeless type. The profile of rim 12a, 14a will be described in more detail later on.

Figure 3:
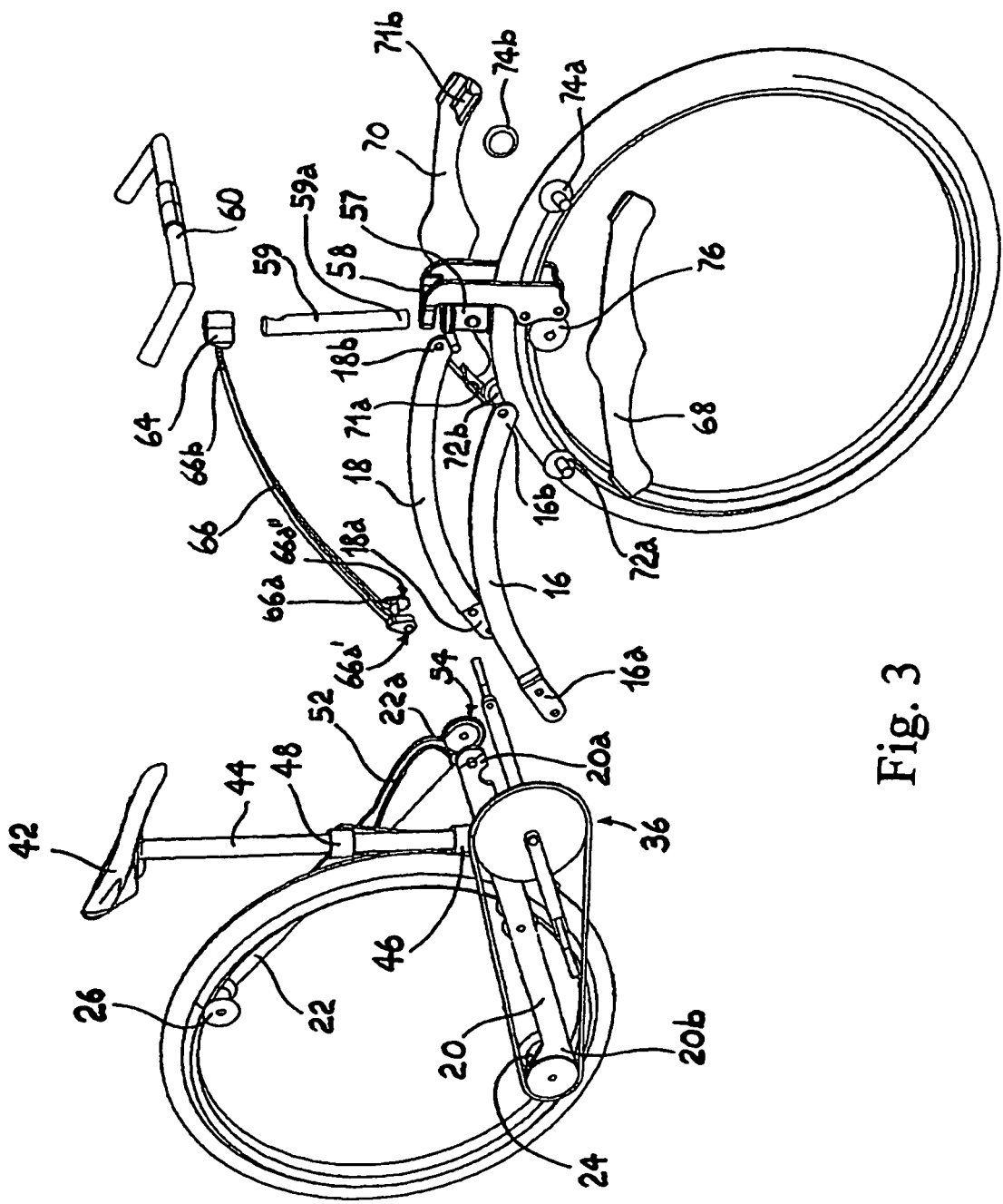
FIG. 3 is an exploded, perspective view of the bicycle according to the invention.
Figure 8:
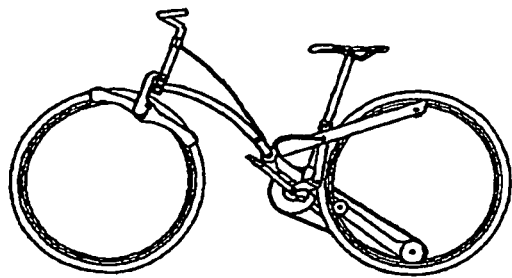
FIGS. 8 to 13 show the bicycle according to the invention in six consecutive steps of convertion from an operative configuration to a folded, carrying configuration.
Figure 11:
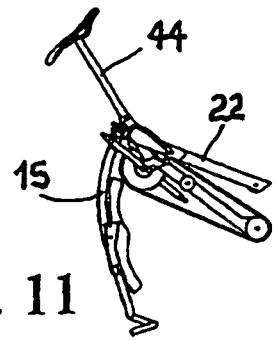

The frame comprises a bar 15 splitted in two side-by-side, half-bars 16, 18 (FIG. 3), which are arranged in mirror-like fashion with respect to the middle plane of bicycle 10, and have an arched profile with its concavity facing downwards. A lower arm 20 and an upper arm 22 have their front ends 20a, 22a hinged to the rear ends 16a, 18a of half-bars 16, 18 about a first transverse axis X1 parallel to the axis of rear wheel 12. As shown in the Figures, arms 20, 22 project from their hinge axis in a scissor-like open fashion. Lower arm 20 and upper arm 22 bear respective rear rollers, i.e., a lower roller 24 and an upper roller 26 respectively, at their rear ends 20b, 22b, which engage the inner profile of rim 12a of rear wheel 12 at diametrally opposite positions.

As shown in FIGS. 4, 5, the inner profile of rear rim 12a has a cylindrical middle portion 28 engaged by corresponding cylindrical middle sections 24a, 26a of lower roller 24 and upper roller 26 respectively, as well as two bevelled, opposite side walls 30', 30" which are laterally restrained between corresponding side edges 24b', 24b", 26b', 26b" of rear rollers 24, 26 having a complementary profile. Lower arm 20 also bears a stabilizing roller 32 at an intermediate position, which internally engages the rim of the rear wheel at third point in front of the other two rear rollers.

Lower roller 24 is connected to a gear wheel 34, which is rotatably coupled with a crown gear 35 of a driving assembly 36 provided with pedals 38 via a chain 40. Driving assembly 36 is hinged to lower arm 20 about a second transverse axis X2 (FIG. 2).

Figure 2:
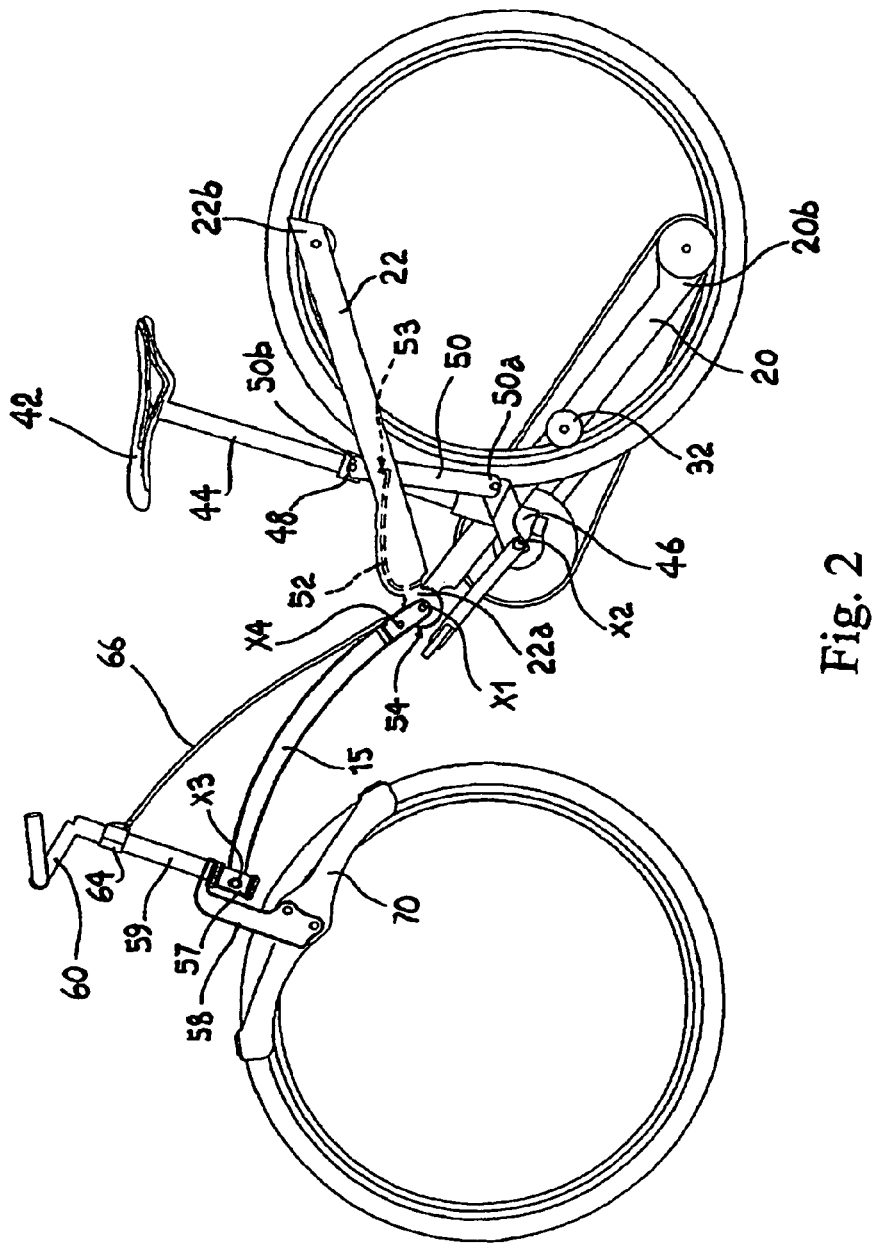
FIG. 2 is another view in side elevation of the bicycle according to the invention, from the opposite side with respect to FIG. 1.

Having now particular reference to FIGS. 1 and 2, a saddle 42 is supported on the top of a post 44, the lower end of which is received in a sleeve 46 which is transversely hinged to lower arm 20 about second axis X2. The axial position of post 44 in sleeve 46 is locked by a conventional locking mechanism (not shown). A first bush 48 is slidably fitted to post 44 and is connected to lower arm 20 via a connecting rod 50 (FIG. 2). Connecting rod 50 has a lower end 50a hinged to lower arm 20 behind the hinge point of sleeve 46, and an opposite, upper end 50b hinged to bush 48. As shown in the Figures, the length of connecting rod 50 and the position of the various hinge points are preferably chosen in such a way that post 44 is sligthly inclined rearwards when the bicycle in its operative configuration, for the scopes which will be clarified later on.

A contoured groove 52 acting as a guide is formed on the inner vertical surface of upper arm 22. Groove 52 is engaged by a sliding pin 53, integral with connecting rod 50, which acts a slide. Groove 52 is shaped in such a way that, when post 44 is rotated towards the front end of the bicycle about hinge axis X2 of sleeve 46 (i.e., clockwise direction in FIG. 1, counterclockwise direction in FIG. 2), upper arm 22 rotates towards lower arm 20 (i.e., counterclockwise direction in FIG. 1, clockwise direction in FIG. 2) by camming action of sliding pin 53 running through groove 52.

Figure 14:
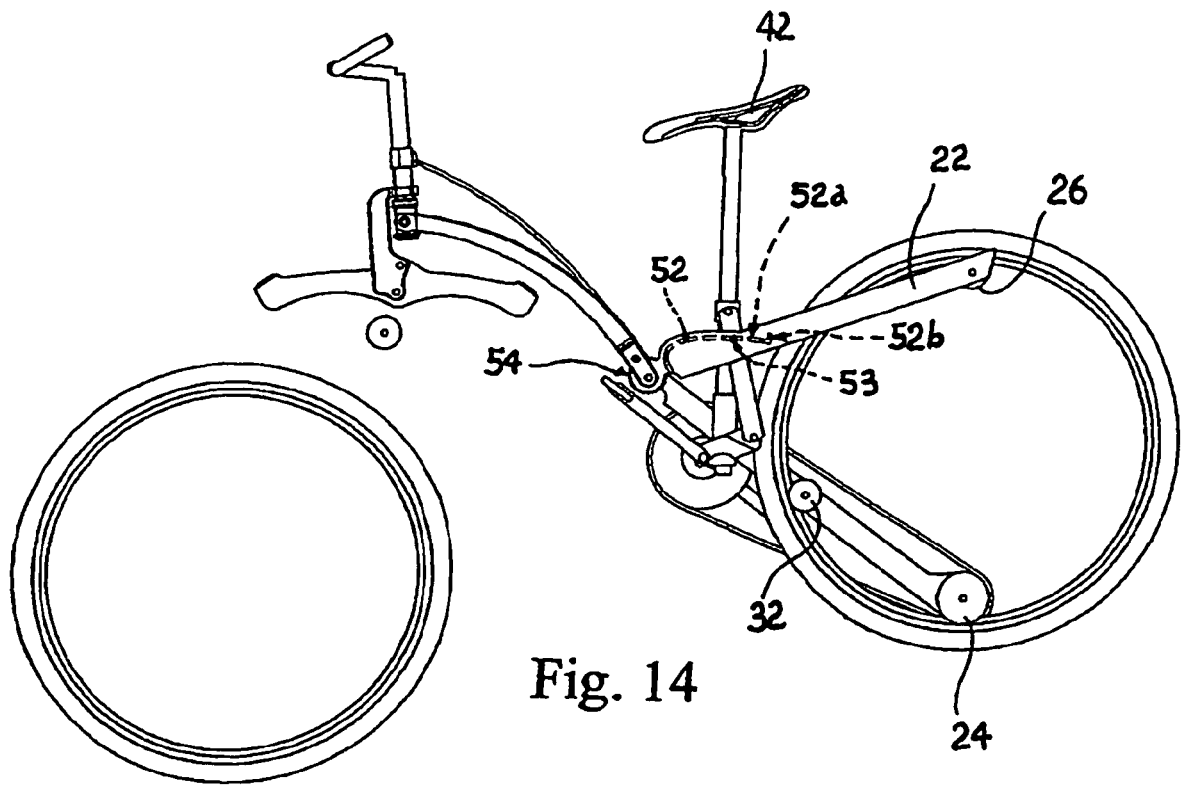
FIG. 14 is a view similar to FIG. 9 to an enlarged scale.

Preferably, as shown in detail in FIG. 14, the rear end of groove 52 extends beyond the point in which both lower roller 24 and upper roller 26 engage rear rim 12a without deforming it, with an interference portion 52a which terminates with a notch 52b. Notch 52b is shaped in such a way that, once pin 53 has been forced into it, after running through interference portion 52a (during this step rim 21a of rear wheel is subjected to a slight elastic deformation), lower roller 24 and upper roller 26 come back to the position of FIG. 2, in which both of them engage rear rim 12a without deforming it.

Upper arm 22 has a first sector gear 54 formed at its front end about its hinging axis X1, for the scopes which will be clarified later on.

The front end of half-bars 16, 18 are connected, via a second sleeve 57, to a fork 58 integral with a pole 59, at the top of which a handlebar 60 is supported. Second sleeve 57 is hinged to the front ends 16b, 18b of half-bars 16, 18 about a third transverse axis X3. The lower end 59a of pole 59 is received within second sleeve 57. A second bush 64 slidable along pole 59 above second sleeve 57 is connected to the rear ends of half bars 16, 18 via a lever 66. Lever 66 has a rear end 66a hinged between the rear ends 16a, 18a of half-bars 16, 18, about a third transverse axis X4 (FIG. 4) located close to, and in front of, the hinge axis X1 about which half-bars 16, 18 are hinged to the rear arms. A front end 66b of lever 66 is hinged to second bush 64. In particular, rear end 66a of lever 66 terminates with two projections 66a', 66a", each of which is hinged to the half-bar on the corresponding side. A second sector gear is formed on one of the projections, 66a", about the hinge axis of the latter, which meshes with sector gear 54 of upper arm 22.

Fork 58 supports front wheel 14 via a pair of side-by-side, mirror-like jaws 68, 70, which are interconnected by bridges 71a, 71b (FIG. 3) and support two pairs of counterposed frustoconical rollers 72a, 72b and 74a, 74b arranged therebetween, which are advantageously spaced at an angle in the range 45° to 90°, preferably 70°, as well as an inner roller 76. As shown in detail in FIGS. 6, 7, front rim 14a is shaped with a cylindrical middle portion 78 engaged by a corresponding, cylindrical middle section 76a of roller 76, as well as two opposite, bevelled side walls 80', 80" which are laterally restrained between corresponding side edges 76b', 76b" of inner roller 76, which have a complementary profile. Each pair of rollers 72a, 72b and 74a, 74b externally engages respective opposite bevelled walls 82', 82" of the outer profile of rim 14a. Roller 76 is hinged to fork 58 about a removable pin 84 which passes through jaws 68, 70 (FIG. 6). The jaws are also anchored to fork 58 via respective studs 86, 88.

FIG. 1 illustrates bicycle 10 in its operative configuration. When rear arms 20, 22 are open in a scissor-like fashion, both rear rollers 24, 26 and stabilizing roller 32 internally engage rim 12a of rear wheel 12. In this configuration, sliding pin 53 restrainedly engages notch 52b (FIG. 2) and, by effect of the inclination of post 44 towards the rear end of the bicycle, the weight of the cyclist (not shown) sitting on saddle 42 contributes in maintaining sliding pin 53 in that position.

Figure 9:
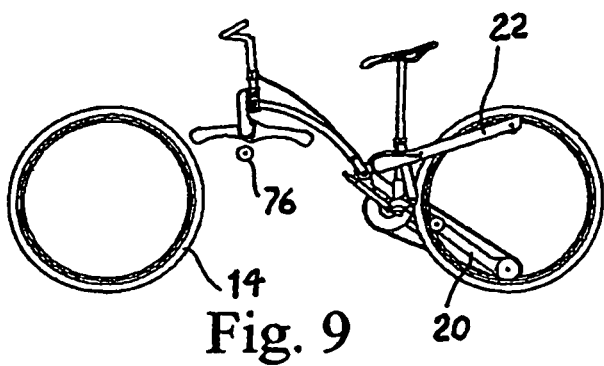
Figure 12:
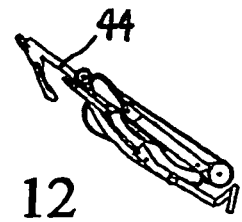

With particular reference to FIGS. 8-13, in order to convert the bicycle to its folded, carrying configuration, pin 84 (FIG. 9) is removed, whereby roller 76 is unlocked and front wheel 14 is consequently set free. To remove rear wheel 12, rear arms 20, 22 are slightly opened (with consequent, slight, elastic deformation of rear rim 12a) until pin 53 disengages notch 52b and engages groove 52 (FIGS. 9, 14). Now that rear wheel 12 can be removed, post 44 supporting saddle 42 is rotated forwards, i.e., in the direction indicated by arrow A 1 in FIG. 10, so that upper arm 22 progressively rotates towards lower arm 20, in the direction indicated by arrow A2 in FIG. 10, by engagement of sliding pin 53 along groove 52.

Figure 10:
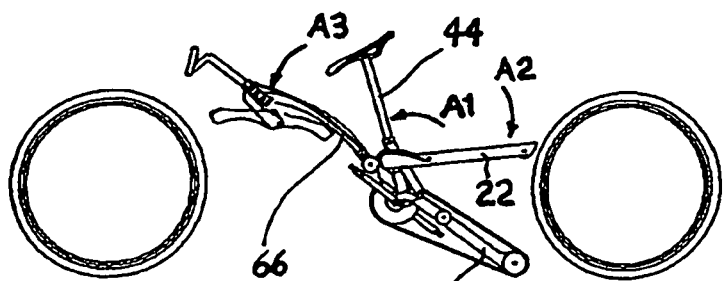
Figure 13:
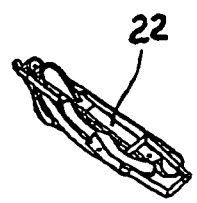
Figure 15:
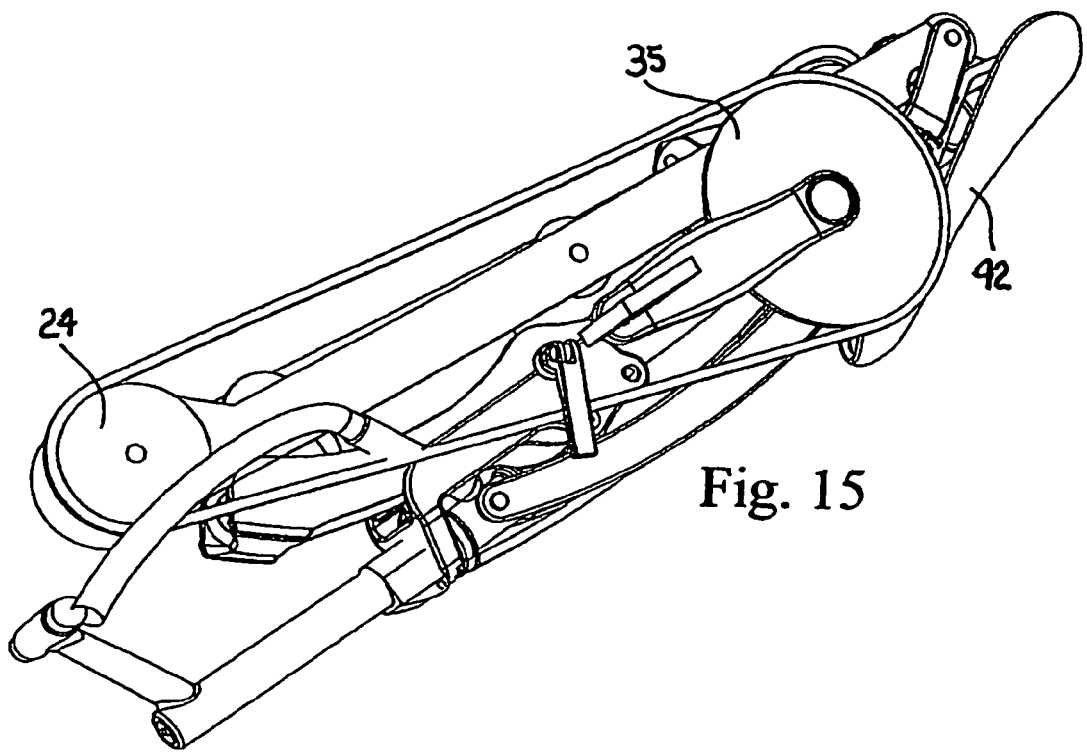
FIG. 15 is a perspective view of the frame of the bicycle in the folded, carrying configuration.

The rotation of upper arm 22 causes lever 66 to simultaneously rotate in the opposite direction, i.e., in the direction indicated by arrow A3 in FIG. 10, by meshing of first sector gear 54 with second sector gear 66a". The rotation of lever 66 causes fork 58 and bar 15 to rotate in the same direction (FIGS. 10, 11), by action of second bush 64 sliding along pole 59, until the frame is completely folded to the compact configuration of FIG. 12. It should be noted that, when bar 15 is closed, jaws 68, 79, which are free to rotate about the respective studs 86, 88, are stored in the concave lower area defined by half-bars 16, 18. In order to completely compact the frame to the folded configuration of FIGS. 13, 15, saddle 42 can be lowered by unlocking the locking mechanism (not shown) and making post 44 slide along sleeve 46.

As the person skilled in the art will immediately understand, the bicycle according to the invention has the advantages of both a traditional bicycle and a foldable bicycle, because, in use, it has a standard size, while, in its folded configuration, it is very compact. Using spokeless wheels allows the free area inside the rims to be used as a housing for the folded frame, so that the whole kit can be received in a bag S, which is shaped and sized ad hoc and can be carried either by hand or on a shoulder, as shown in FIG. 16. Alternatively, the frame and the wheels could be carried by different users.

The above-described folding system is also practical and handy because, once removed the wheels, the various projecting parts of the frame, particularly rear arms 20, 22, post 44 supporting saddle 42, bar 15, and fork 58 with pole 59 attached thereto which supports handlebar 60, are interconnected in such a way that they simultaneously close in a sole movement.

The possibility of quickly removing the wheels is also advantageous when replacements or repairs are required, e.g., in case of puncture of a tire.

A preferred embodiment has been described herein, but of course many changes may be made by a person skilled in the art within the scopes of the claims. In particular, although the bicycle according to the preferred embodiment is provided with spokeless wheels, of course, it could also be provided with traditional wheels with spokes, with mere constructional changes which will be obvious to the person skilled in the art. For instance, fork 58 could be extended in order to support the front wheel at the hinge axis thereof, and lower arm 20 could be suitably shaped in such a way that it supports the rear wheel at the hinge axis thereof. In this case, of course, upper arm 22 can be reduced in length because it does not have to support the rear wheel any more. Moreover, it is evident that other safety locking means could be provided by the skilled person in order to prevent accidental closing of the frame. Of course, mere constructional changes obvious to the skilled person should be included within the scope of the claims. For instance, jaws 68, 70 could be made from a single piece, rather than being two different elements. Furthermore, the sector gears could be replaced by engagement angular sectors of a different type, such as friction sectors forming a friction gearing, and the like.

What is claimed is:

1. A foldable bicycle provided with a frame supported on a rear wheel and a front wheel, said frame comprising:
    a first arm having a rear end to which said rear wheel is linked,
    a fork with handlebar, to which said front wheel is linked,
    a bar connecting a front end of said first arm to said fork, said bar being hinged to said first arm about a first axis parallel to the axis of said rear wheel, and
    a post supporting a saddle, said post being hinged to said first arm about a second axis parallel to the axis of said rear wheel,
    said first arm, said bar and said post being interconnected via transmission means for simultaneously rotating about said first axis and second axis between an operative configuration, in which they project at angularly spaced positions suitable for a user to drive the bycicle, and a carrying configuration in which they are collapsed on one another,
    wherein said transmission means comprise a first engagement angular sector hinged about said first axis and rotatably coupled with said post via first linkages, and a second engagement angular sector in rotary engagement with said first engagement angular sector and rotatably coupled with said bar via second linkages.

2. The bicycle of claim 1, wherein said first engagement angular sector and said second engagement angular sector respectively comprise a first sector gear and a second sector gear meshing with each other.

3. The bicycle of claim 2, wherein said first linkages comprise a first bush slidably fitted to said post and connected to said first arm via a connecting rod, and a second arm integral with said first sector gear and provided with a guide engaged by a sliding member integral with said connecting rod, said guide being shaped such that the rotation of said post in a first direction towards said carrying configuration causes said second arm to rotate in an opposite direction and, consequently, said bar to rotate in said first direction towards said carrying configuration by rotary engagement between said first engagement angular sector and said second engagement angular sector.

4. The bicycle of claim 3, wherein said rear wheel comprises a rear spokeless rim supporting a tubular tire, and said rear spokeless rim is supported by said first arm and said second arm via respective rear rollers hinged to the rear ends of the arms and engaging the inner profile of said rear spokeless rim at diametrally opposite positions.

5. The bicycle of claim 4, wherein an inner profile of said rear spokeless rim has a cylindrical middle portion engaged by corresponding cylindrical middle sections of said rear rollers, as well as two opposite, bevelled side edges laterally restrained between corresponding side edges of said rear rollers.

6. The bicycle of claim 4, further comprising a further stabilizing roller supported on one of said first arm or second arm, which internally engages said rear spokeless rim at an intermediate position between said rear rollers.

7. The bicycle of claim 4, wherein a first end of said guide extends beyond the point in which it causes both of said rear rollers to engage the rear rim without deforming it, with an interference portion which terminates with a locking seat shaped in such a way that, when engaged by sliding member, said rear rollers engage the rear rim without deforming it.

8. The bicycle of claim 3, wherein said guide consists of a groove formed on said second arm.

9. The bicycle of claim 7, wherein said locking seat consists of a notch into which the end of said interference section is deviated.

10. The bicycle of claim 1, wherein said fork is hinged to said bar about a third axis parallel to the axis of rotation of said rear wheel, said second engagement angular sector is hinged to said bar about a fourth axis parallel to the axis of rotation of the rear wheel, and said second linkages comprise a lever having a first end integral with said second engagement sector and an opposite end hinged transversely to a second bush that is slidable on a pole integral with said fork.

11. The bicycle of claim 1, wherein said front wheel comprises a front spokeless rim having a tubular tire mounted thereon, and is linked to said fork via two pairs of counterposed rollers which are angularly spaced from each other and engage the outer profile of said front rim, as well as via an inner roller which engages the inner profile of the front spokeless rim at an intermediate position between the two pairs of rollers.

12. The bicycle of claim 11, wherein an inner profile of said front wheel has a cylindrical middle portion engaged by a corresponding cylindrical middle section of the inner roller, as well as two opposite, bevelled side walls laterally restrained between corresponding side edges of the inner roller.

13. The bicycle of claim 12, wherein said counterposed rollers have counterposed frustoconical profiles and engage corresponding opposite, beveled side edges of the outer profile of said front spokeless rim.

14. The bicycle of claim 1, wherein said post is pivotally received into a sleeve hinged to said first arm about said second axis, and is lockable.

\* \* \* \* \*